(12) United States Patent
Ball et al.

(10) Patent No.: US 11,653,785 B2
(45) Date of Patent: May 23, 2023

(54) STEAM COOKING APPLIANCE

(71) Applicant: BSH Hausgeräte GmbH, Munich (DE)

(72) Inventors: Ludovic Ball, Sessenheim (FR);
Sebastian Frey, Königsbach-Stein (DE); Manfred Hintermayer, Karlsruhe (DE); Martin Nagel, Forstheim (DE)

(73) Assignee: BSH Hausgeräte GmbH, Munich (DE)

( * ) Notice: Subject to any disclaimer, the term of this patent is extended or adjusted under 35 U.S.C. 154(b) by 268 days.

(21) Appl. No.: 16/641,268

(22) PCT Filed: Jul. 25, 2018

(86) PCT No.: PCT/EP2018/070112
§ 371 (c)(1),
(2) Date: Feb. 24, 2020

(87) PCT Pub. No.: WO2019/038007
PCT Pub. Date: Feb. 28, 2019

(65) Prior Publication Data
US 2020/0352382 A1    Nov. 12, 2020

(30) Foreign Application Priority Data
Aug. 25, 2017  (DE) ..................... 10 2017 214 932.9

(51) Int. Cl.
*A47J 27/04*    (2006.01)
*F24C 15/32*    (2006.01)

(52) U.S. Cl.
CPC ............ *A47J 27/04* (2013.01); *F24C 15/327* (2013.01); *A47J 2027/043* (2013.01)

(58) Field of Classification Search
None
See application file for complete search history.

(56) References Cited

U.S. PATENT DOCUMENTS 7,091,454 B2    8/2006  Kobayashi
7,337,921 B2 *  3/2008  Ma .................... A21B 10/02
                                                          222/83.5
(Continued)

FOREIGN PATENT DOCUMENTS

CN    202015079 U     10/2011
CN    102748851 B  *  9/2014  ............... F24H 1/36
(Continued)

OTHER PUBLICATIONS

Machine translation of WO 2016147563 A1 performed on Jan. 6, 2022, Shibuya et al. (Year: 2016).*

(Continued)

*Primary Examiner* — Brian W Jennison
*Assistant Examiner* — Kevin Guanhua Wen
(74) *Attorney, Agent, or Firm* — Michael E. Tschupp; Andre Pallapies; Brandon G. Braun (57) ABSTRACT

A steam cooking appliance includes a cooking chamber, an evaporator unit configured to evaporate water to generate steam for supply into the cooking chamber, and a water supply unit including a removable water tank. The water tank includes a valve unit for coupling to the evaporator, with the valve unit including two valves formed separately from one another.

23 Claims, 4 Drawing Sheets

(56) References Cited

U.S. PATENT DOCUMENTS

| | | | |
|---|---|---|---|
| 8,347,659 B2 * | 1/2013 | Powers et al. ......... | E05B 73/00 |
| | | | 70/14 |
| 10,645,765 B2 | 5/2020 | Akira | |
| 2005/0127061 A1 | 6/2005 | Ha | |
| 2006/0249136 A1 | 11/2006 | Reay | |
| 2008/0169741 A1 * | 7/2008 | Jurja ..................... | A47B 88/04 |
| | | | 312/319.1 |
| 2013/0202279 A1 * | 8/2013 | Reichl et al. ......... | F24H 1/142 |
| | | | 392/480 |
| 2014/0251304 A1 | 9/2014 | Winkelmann et al. | |

FOREIGN PATENT DOCUMENTS

| | | | | |
|---|---|---|---|---|
| EP | 1724529 A1 * | 4/2006 | ............. | F24C 15/32 |
| EP | 2037183 A1 * | 9/2007 | ............. | F24C 15/32 |
| EP | 2037183 A1 | 3/2009 | | |
| EP | 2463585 A1 | 6/2012 | | |
| EP | 2786683 A1 * | 10/2014 | ........... | F24C 15/327 |
| JP | 2007003112 A | 1/2007 | | |
| WO | WO 2016147563 A1 * | 9/2016 | ........... | A47J 36/027 |

OTHER PUBLICATIONS

Machine translation of CN 102748851 B performed on May 17, 2022, Gao (Year: 2014).*
Machine translation of EP 2786683 A1 performed on Oct. 6, 2022, Arth et al. (Year: 2014).*
International Search Report PCT/EP2018/070112 dated Oct. 19, 2018.
National Search Report CN 201880055257.3 dated Mar. 26, 2021.
Report of Examination EP 18 746 162.9 dated Mar. 3, 2022.

* cited by examiner

Fig. 6

STEAM COOKING APPLIANCE

CROSS-REFERENCES TO RELATED APPLICATIONS

This application is the U.S. National Stage of International Application No. PCT/EP2018/070112, filed Jul. 25, 2018, which designated the United States and has been published as International Publication No. WO 2019/038007 A1 and which claims the priority of German Patent Application, Serial No. 10 2017 214 932.9, filed Aug. 25, 2017, pursuant to 35 U.S.C. 119(a)-(d).

BACKGROUND OF THE INVENTION

The invention relates to a steam cooking appliance comprising an evaporator unit using which water can be evaporated and the steam produced in the evaporator unit can be supplied into the cooking chamber of the steam cooking appliance, and a water supply unit which has a removable water tank comprising a valve unit for coupling to the evaporator unit.

Prior Art

Ovens are known which also offer the possibility of preparing food to be cooked by generating steam in the cooking chamber. During preparation, bursts of steam are generated which are conducted into the cooking chamber or are first generated therein. For this purpose, a container for storing water is required. In known appliances, this can be arranged in the region of the control panel of the oven and can be removed therefrom. In conventional embodiments, removal can be relatively complicated and cumbersome. Furthermore, the filling of the water tank is often difficult. Moreover, the known water supply units can have a disadvantage with regard to an unfavorable thermal balance.

EP 2 463 585 A1, for example, discloses a water tank for a steam cooking appliance, having a container for receiving the water, wherein a front cover is arranged on the container as a panel which is arranged so as to be moveable relative to the container.

The description of the prior art is provided to facilitate understanding of the background of the present invention, and may include items outside the prior art known to the average person skilled in the art.

Object Underlying the Invention

It is an object of the present invention to provide a steam cooking appliance which is improved compared with the prior art and that eliminates the aforementioned disadvantages while maintaining the advantages achieved from the prior art.

Solution According to the Invention

The solution of the set object is achieved by a steam cooking appliance with the features of claim 1. According to the invention, this can be achieved in a steam cooking appliance according to the preamble of claim 1 in that the valve unit has two valves which are formed separately from one another.

Provision can be made for a positioning aid or at least one guide means to be provided in a housing accommodating the water tank, as a result of which the water tank can be brought into the correct installed position for fluidic coupling with the valve. By means of the positioning aid and/or the guide means, which has, for example, a groove formed on an inner wall of the housing and/or a projection and/or a protrusion, a contour is thus created within the housing so that, irrespective of the position when the water tank is introduced into the housing, a proper installed position of the same can be ensured at any time. It goes without saying that the positioning aid or the guide means can be formed by at least one other element, as a result of which it is likewise possible to ensure a type of "anti-rotation protection of the water tank" in the sense of the manner described above.

A steam cooking appliance is to be understood as meaning any household appliance which cooks food to be cooked introduced into a cooking chamber by means of steam and/or improves the result of a food to be cooked. It goes without saying that the steam cooking appliance can be both a cooking appliance, for example an oven, with a steam function in which, in addition to the steam produced, there are also further heat sources in the form of, for example, heating elements, and also a steam cooking appliance which uses only steam for heating/cooking food to be cooked.

In addition to the above-mentioned water tank, the water supply unit can also have further components which may be required for supplying an evaporator unit with water. These include, for example, a water supply unit which connects the water tank to the evaporator unit, and all types of lines and/or line systems as well as connecting and/or connection elements. The water supply unit has means for coupling to the water tank at a first end section and means for coupling to the evaporator unit at a second end section. In particular, the water supply unit is designed in such a way that it enables a water circuit according to the bird bath principle. This bird bath principle is well known to the person skilled in the art, and therefore a detailed description thereof can be omitted.

During operation, the water stored in the water tank can be supplied to an evaporator unit arranged in the steam cooking appliance. Steam can be generated by means of the evaporator and made available in the cooking chamber of the steam cooking appliance. The function of an evaporator unit is well known to the person skilled in the art, and therefore a detailed description thereof can be omitted.

The valve unit formed by two valves is arranged on a rear side of the water tank in the installed position. An installed position of the water tank is to be understood to mean the position in which the water tank is accommodated in the steam cooking appliance, for example in a holder provided for this purpose, and in particular is ready for operation. The valve unit may be provided in/at an outlet opening formed on the water tank or a main body of the water tank.

By means of two valves formed separately from one another, it is possible for air and water to be carried in separate lines in order to operate according to the principle of the bird bath. This in turn enables a reduction in the diameters of the individual pipelines of the water supply unit which, compared to a solution with only one valve, has thermal advantages on account of lower heat losses arising as a result of feedback of the heat from the evaporator in the direction of the water tank. This means that, due to the reduced diameters of the individual valves or of the pipelines, the heat conduction from the evaporator unit arranged within a cooking chamber of the steam cooking appliance can be reduced in the direction of the water tank. In addition, smaller openings can be provided for the pipelines in adjacent components. As a result, the evaporator unit has less influence on the entire steam cooking appliance with regard to the temperature balance.

Advantageous embodiments and developments which can be used individually or in combination with one another are the subject matter of the dependent claims.

According to one embodiment of the invention, the valves are essentially arranged one above the other in an installed position of the water tank. As a result, a water circuit required for the bird bath principle can be implemented using simple means.

Preferably, in one operating state of the steam cooking appliance, one of the valves is designed for guiding water and the other of the valves for guiding air, wherein the valve designed for guiding air can be arranged above the valve designed for guiding water in the installed position. This makes it possible to ensure that the air can be guided separately from the water. It is conceivable that the two valves are arranged on the rear side of the water tank at a maximum distance from one another and/or in a plane essentially perpendicular to a main direction of extension of the water tank.

The two valves may be structurally identical. This means that the two valves may for example have the same flow cross-section. The valves are formed in a non-limiting manner in the form of an exhaust valve. The exhaust valve designed to guide water allows the water stored in the water tank to run off in the operating state of the steam cooking appliance in the direction of a container of the evaporator unit as soon as the valve unit is coupled or connected to a connection element or docking connection of a water supply unit. Due to the bird bath principle, the container of the evaporator unit fills until the water in the container has reached a certain level. During this filling process, the air displaced by the water is fed from the container of the evaporator unit back into the water tank. This is therefore a closed circuit.

In a further embodiment of the present invention, provision is made for the water supply unit to have a receiving unit for receiving the water tank, wherein the receiving unit is attached in particular to a panel support of the steam cooking appliance and has an essentially elongated, preferably cylindrical, more preferably circular-cylindrical design. The receiving unit preferably has a lower and an upper housing shell and is preferably made from a plastic. It is particularly advantageous if the receiving unit has an interface/connection which corresponds to the interface/connection of a toggle pot which is likewise arranged on the panel support. As a result, advantages can be achieved both in production and assembly as different openings/punch-throughs do not have to be produced in the panel support for the receiving unit. A microswitch by means of which it can be detected whether the water tank is completely coupled, can preferably be arranged, in particular on an outer side of the receiving unit. For example, in the event of a faulty, i.e. incomplete coupling of the water tank by the microswitch to a control of the steam cooking appliance, a signal could be output via the faulty coupling so that in turn a corresponding message could be output to a user.

It is understood by the average person skilled in the art that in the case of a receiving unit formed by an upper and lower housing shell, both housing shells can each have the shape of a corresponding semi-cylinder, for example. Moreover, it goes without saying that the elongated, preferably cylindrical or circular-cylindrical construction does not have to extend over the entire length of the receiving unit, but rather only a certain or predetermined section has this shape. In particular, the length of this section corresponds to 50%, preferably 60% and more preferably more than 70% of the total length in the direction of extension of the receiving unit. In particular, the length of the shape mentioned above essentially corresponds to the length of the water tank introduced in the operating state.

According to a further embodiment of the present invention, the receiving unit comprises an adapter part having two first connection means for fluidically coupling to the water tank in an operating position on the one hand and having two second connection means for fluidically coupling to the evaporator unit on the other hand. In terms of fluidic coupling, it is to be understood that, after coupling has taken place, for example, the water stored in the water tank can flow in the direction of the second connection and thus further in the direction of the evaporator unit and/or the air present in the line system can flow back into the water tank due to the bird bath principle and thus a closed circuit. This enables simple and secure coupling between the water tank and the evaporator unit as well as of the water tank in the receiving unit.

According to a further preferred embodiment of the present invention, the adapter part has at least one latching hook for latching the water tank to the adapter part, wherein the latching hook is latched by means of a latching section or latching projection formed on the main body of the water tank in the completely inserted state of the water tank. The latching hook can preferably be provided on a circumferential section of the adapter part. As a result, the adapter part thus essentially has two functions, namely on the one hand, enabling fluidic coupling between the water tank and the evaporator unit and on the other hand, the secure latching of the water tank in its operating position.

According to yet another preferred embodiment of the present invention, the adapter part comprises two connecting elements which are formed separately from one another, each of which forms a first connection means and a second connection means. The connecting elements can be formed, for example, by sealing pins or the like. Separate air and water guidance can be made possible with simple means by means of the separately formed connecting elements. Moreover, costs can be saved due to the one-piece nature of the connecting elements. Preferably, both connecting elements can be structurally identical and thus have the same flow cross-sections.

Preferably, the first connection means are each formed by a sealing connection piece for fluidic coupling to the valves, wherein a connecting element can have the sealing connection piece. As a result, for example, a secure coupling to the valves arranged in the water tank can be achieved so that water can be prevented from escaping via the connecting elements. It is further preferred if the sealing connection piece is essentially supported on the adapter part in an actuating direction of the water tank, in particular spring-loaded. As a result, an improved sealing effect can be realized again. In the event that the adapter part has two connecting elements formed separately from one another by means of which a first connection means and a second connection means are respectively formed, the connecting element has the sealing connection piece or the sealing connection piece is formed by at least one section of the closure element.

According to a further preferred embodiment of the present invention, each sealing connection piece has a seal, preferably a rubber seal formed as an O-ring. As a result, a discharge of liquid in the form of water can be securely prevented. The O-rings can be provided, for example, between a circumferential flange section, which is formed on an end section of the connecting element, and a circumferential edge, which is formed on a main body of the connecting element, so that the respective 0-ring is held securely.

The adapter part is preferably mounted such that it can be displaced essentially in an actuating direction of the water tank in a bearing section formed in the receiving unit, as a result of which, for example, a mechanism for inserting and removing the water tank can be realized. The insertion and removal can be provided both manually and in the form of an electric motor. In the case of the electric motor, for example, a button could then be provided in the control panel in order to start the insertion and/or removal of the water tank. The actuating direction of the water tank corresponds to the direction in which the water tank can be inserted into and removed from the receiving unit.

It is particularly preferred if the adapter part has a slotted guide and spring force is applied essentially in the actuating direction by a spring, wherein a sliding block, which is guided in particular in a retaining clip, engages in the slotted guide. As a result, a unit/arrangement for insertion and/or removal of the water tank can be realized in a simple manner. In particular, a so-called cardioid is provided as a slotted guide. The provision of a spring/compression spring which acts on the adapter part with a spring force has the advantage that the unit/arrangement and thus the water tank can be brought into firmly defined positions and no intermediate positions can arise. According to a development, the spring can be supported on a securing spring or a securing bracket which is arranged on the receiving unit, preferably on the lower housing shell. However, it can also be provided that the spring/compression spring is supported at least in sections on an edge formed on the circumferential side of the receiving unit. The sliding block can preferably be guided in a longitudinal slot of a retaining clip, which can be arranged on the lower housing shell or upper housing shell. The longitudinal slot runs essentially perpendicular to a main extension direction of the water tank or to the aforementioned actuating direction thereof.

According to yet another preferred embodiment of the present invention, the water tank has a closure element on the front side of the water tank facing a user, which closure element can preferably be fastened to a main body of the water tank by means of a bayonet or screw closure. In the installed position, the water tank has a front side facing a user and a rear side opposite the front side. The closure element can form, at least in sections, the front side or the rear side of the water tank. This is to be understood as meaning that the front surface of the closure element facing a user of the steam cooking appliance forms at least part of the front or rear side. Thus, it would also be conceivable for the front surface of the closure element to have a surface dimension which is smaller than the surface dimension of the cross-sectional area of the water tank, wherein the front surface and the cross-sectional area are essentially parallel to one another. However, it is also conceivable that the front surface has a surface dimension that is greater than that of the cross-sectional area. This could be advantageous in particular if a diameter of the water tank or its cross-sectional area is smaller than the diameter or the cross-sectional area of the closure element to be integrated into the control panel of the steam cooking appliance. A water tank can thus be integrated into the control panel, the closure element of which has, for example, the same optical system and/or size and/or shape as an adjacent operating toggle of the steam cooking appliance.

According to the invention, it is provided that the closure element can form the front side or the rear side of the water tank. If the closure element forms the front side of the water tank at least in sections, then the front surface of the closure element faces the user in the installed position of the water tank. In contrast, if the closure element at least in sections forms the rear side of the water tank, the front surface of the closure element faces away from the user and thus is not visible to the user. Thus, the user standing in front of the steam cooking appliance would only be able to see the bottom or bottom area, whereas the rear side of the water tank formed by the closure element is covered in the appliance. It will be understood by the average person skilled in the art that in the latter case, means/components are provided in the closure element that are configured to connect/couple to the water supply unit. Thus, the difference between the two variants described is only that the attachment of the closure element takes place in reverse.

From a design point of view, it is particularly desirable here that the front side or the rear side of the water tank is essentially flush with the front surface of the control panel. That is, the front or rear side of the water tank is integrated into the control panel in the installed position thereof in such a way that there are no disturbing components which protrude or are set back with respect to a front surface of the control panel in the direction of a user. As a result, a homogeneous appearance can be realized in an advantageous manner. The closure element or the front side of the closure element is handle-free and is in particular flat, so that a good integration into the control panel can be realized. The closure element closes a filling opening of the water tank in such a way that no more water can escape when the water tank is in the installed position. Due to the fact that the closure element at least in sections forms the front side or the rear side of the water tank, a positive appearance of the steam cooking appliance can be realized as the respective side of the water tank can be advantageously integrated into the design of the appliance without having to compromise in terms of user comfort during removal/filling of the water tank. In other words, from the design point of view, almost complete integration of the water supply unit or of the water tank into a panel support or a control panel of the steam cooking appliance is possible.

Preferably, a main body of the water tank has an essentially elongated, preferably cylindrical, more preferably circular-cylindrical design, for which reason the filled water is stored in this (main) part of the water tank. This would have the advantage that an improved optical result and improved handling during the filling of the water tank can be achieved on the one hand in relation to the operating toggle arranged next to the water tank in/on the control panel of the steam cooking appliance. This means that the user standing in front of the steam cooking appliance would be able to get the impression that the inserted water tank, i.e. in the installed position, is optically an operating toggle. It is furthermore preferred that markings concerning the filling level are provided on the essentially transparent main body of the water tank. The main body may be made of plastic in a non-limiting manner. It is understood that the entire water tank can be made of plastic. However, it is also conceivable that the closure element has a different material than that of the main body. The closure element can be attached to a first end section of the main body, for example by one of the above-mentioned closure types, the main body having an embodiment corresponding to the type of closure, for example a thread, part of a bayonet closure or the like on the first end section. On the second end section of the main body opposite the first end section, an outlet opening is provided, in which a valve is attached, which will be described later.

For better sealing, the closure element can have a seal, in particular a rubber seal. An improved sealing effect can thereby be achieved. It can be provided, for example, that the seal has an outer diameter which essentially corresponds to an inner diameter of the closure element. In the closed state of the closure element, the seal essentially rests against an end-face front section of the main body. The seal can be inserted loosely into the closure element or can be firmly connected thereto. In the case of a one-piece/integral design of the closure element and the seal, a loss of the loose seal could be prevented.

Preferably, the rubber seal is designed as an O-ring which, in a closed position of the closure element, is pressed against a sealing edge of the main body by a spring. A further improved sealing effect can thus be achieved. As a spring, any type of spring, such as a coil spring, spiral spring or the like, may be used in the entire disclosure in a non-limiting manner. It is particularly preferred that the O-ring is arranged on a seal support, in particular a pot-shaped seal support, and that the spring is arranged between a closure cover of the closure element and the seal support. This arrangement has the advantage that the seal in the form of the O-ring is pressed in a spring-loaded manner against the sealing edge formed on the main body, for which reason the sealing effect is further intensified. Moreover, it is provided that the seal support is designed in such a way that it is attached to the closure cover, for example by means of a catch. As a result, a closure element in the form of a compact structural unit can be produced, which has the closure cover, the seal, the seal support and the spring arranged between the seal support and the closure cover. In this connection, a circumferential groove/depression is provided on the seal support on/into which groove/depression the O-ring can be attached. The groove is arranged in particular on an end section facing the main body of the water tank.

According to yet another preferred embodiment of the present invention, the closure element has a cover cap which, in the installed position, forms the front side of the water tank facing a user at least in sections. This makes it possible to achieve a specific adaptation to the existing design of the steam cooking appliance. This relates in particular to the instances in which different panel materials such as, for example, glass, metal or the like, are used. Moreover, by means of a cover cap integrated into the appearance of the steam cooking appliance, it is possible to cover different design lines of a household appliance manufacturer. In this case, it is particularly preferred if the closure element or the closure cover has an interface/connection which corresponds to the interface/connection of the operating toggle. In the case of the attachment of the cover cap, it is likewise provided that the front side of the water tank is flush with the front surface of the control panel.

According to an embodiment of the invention, the water tank can be removed from the steam cooking appliance by means of a push-push unit. However, any other principle suitable for inserting and removing the water tank may also alternatively be used for this purpose as well. For example, it is also possible to provide an unlocking mechanism which is actuated, for example, by an unlocking button mounted on the control panel. In this case, actuation of the button would lead to an at least partial ejection of the water tank. The locking in the receiving unit could then be realized, for example, by inserting and locking the same by the user. When using a push-push unit, there can be three essential states without restriction. First, a retracted state corresponding to an operating state of the water tank in which the water tank is fully docked so that water can be discharged from the water tank in the direction of the evaporator unit. In this state, the front side of the water tank is substantially flush with the front surface of the control panel. A second state may correspond to a depressed state after actuation of the push-push unit. In this case, the front side of the water tank is pressed until the water tank reaches an end position on the basis of the sliding block guided in the slotted guide. In this depressed state, the front is set back with respect to the front surface. The offset to the rear, that is to say, in the direction of insertion of the water tank, can, for example, be approximately 3 mm. A third state may correspond to an extended state of the water tank. The extended state is reached after removal of the force generated by the pressing onto the front side of the water tank until the water tank reaches a further end position on account of the sliding block engaging in the slotted guide. In this extended state, the front side of the water tank projects in the direction of a user with respect to the front surface of the control panel. The corresponding offset to the front can be approximately 18 mm, so that there is a sufficiently large area for grasping and removing the water tank.

The embodiment of the valve unit according to the invention enables the thermal balance of the entire steam cooking appliance to be improved. The steam cooking appliance also has a simple water supply unit with a water tank which is easy to fill and is thus less susceptible to malfunction than the appliances known from the prior art. Furthermore, the specific embodiment of the completely removable water tank simplifies the filling process as the water tank can be filled with the aid of a normal water tap. After a filling process, the water tank can be closed by the closure element and introduced into the receiving unit provided on the steam cooking appliance. In this case, it is likewise conceivable that an anti-rotation safeguard is provided on the water tank and/or the receiving unit.

Further features of the invention emerge from the claims, the figures and the description of the figures. The features and feature combinations mentioned above in the description and the features and feature combinations mentioned below in the description of the figures and/or shown in the figures alone can be used not only in the respectively specified combination, but also in other combinations or in isolation, without departing from the scope of the invention.

BRIEF DESCRIPTION OF THE DRAWINGS

The above and other features of the present invention will now be described in detail with reference to certain exemplary embodiments thereof, which are illustrated by the accompanying drawings, and which are merely for illustration purposes hereinafter, and thus are not intended to be limiting of the present invention. In the drawing.

It should be noted that the accompanying drawings are not necessarily to scale and represent a somewhat simplified illustration of various preferred features which serve to illustrate the principles of the invention. The specific structural features of the present invention, as disclosed herein, including, for example, specific dimensions, orientations, installation locations and shapes, are partially determined by the dedicated application and the working environment.

In the figures, identical or functionally identical elements are provided with the same reference characters.

DETAILED DESCRIPTION OF THE FIGURES

Exemplary embodiments of the present invention are explained in detail hereinafter with reference to the accompanying drawings.

Figure 1:
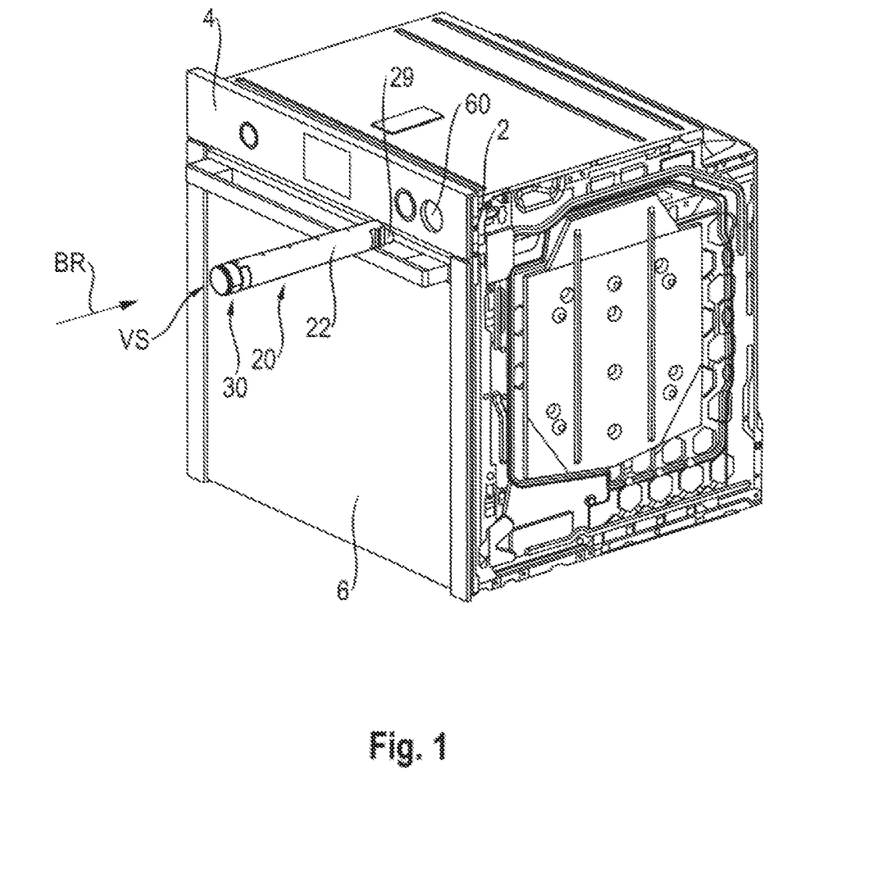
FIG. 1 shows a perspective view diagrammatically illustrating a household appliance in the form of a steam cooking appliance according to a first exemplary embodiment of the present invention.

FIG. 1 shows a simplified diagrammatic illustration of a perspective view of a household appliance in the form of a steam cooking appliance according to a first exemplary embodiment of the present invention. The steam cooking appliance has a cooking chamber (not shown) located behind a door 6 into which food to be cooked can be introduced. During operation of the steam cooking appliance, food introduced into the cooking chamber is cooked by steam introduced into the cooking chamber. The steam is generated by an evaporator unit (not shown).

The steam cooking appliance has a control panel 4 which is mounted on a panel support 2 and is arranged above the door 6. In a right-hand region of the control panel 4, a water tank 20 can be introduced into a receiving unit 60 for coupling to the evaporator unit. The water tank 20 has a main body 22 which is closed at the front side VS by a closure element 30 in the state shown. The main body 22 has an elongated circular-cylindrical shape. An outlet opening 29 is formed on an end section of the main body 22 facing the steam cooking appliance. In the actuating direction BR, the water tank 20 can be inserted into and removed from the receiving unit 60 in a non-destructive and reversible manner in order to achieve an operating position. The liquid medium provided for evaporation in the form of water is stored in the water tank 20.

Figure 2:
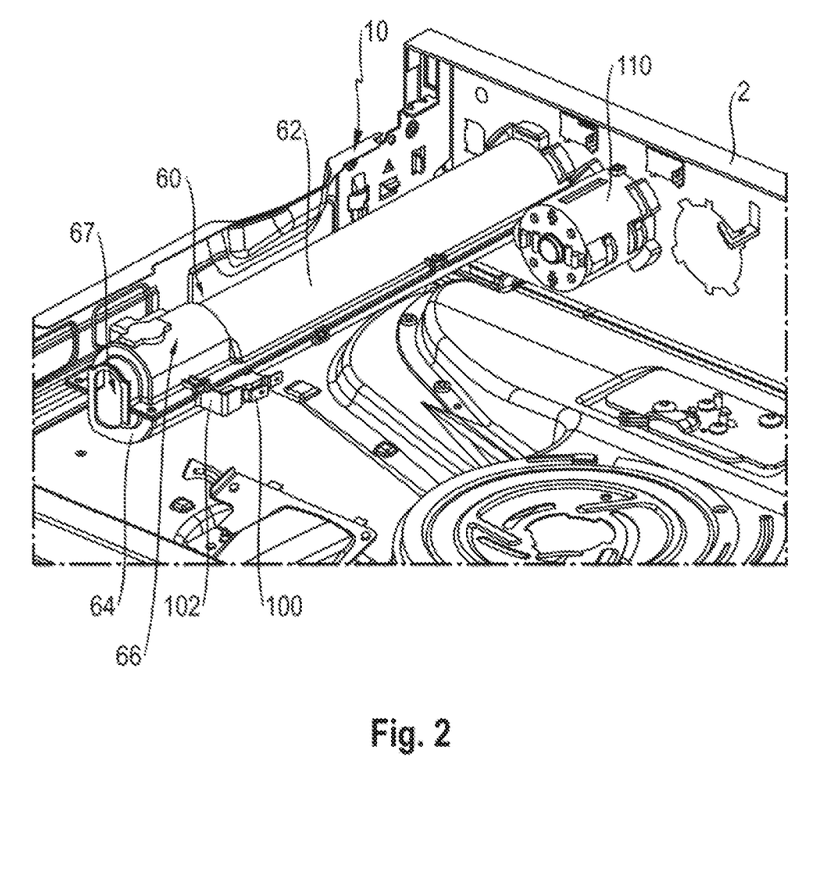
FIG. 2 shows a perspective view which diagrammatically illustrates a section of the steam cooking appliance of FIG. 1 without an upper housing part.

FIG. 2 is a perspective view diagrammatically illustrating a section of the steam cooker of FIG. 1 without an upper housing section of the steam cooker. A two-part receiving unit 60 of a water supply unit 10 is mounted on the rear side of the panel support 2 on a recess formed in the panel support 2. It can be clearly seen that a connection of the receiving unit 60 to the panel support 2 corresponds to a connection of a toggle pot 110, for which reason only one type of recess for the receiving unit 60 and the toggle pot 110 is provided in the panel support 2.

The receiving unit 60 is formed from an upper housing part 62 and a lower housing part 64. In the assembled state, in which the upper housing part 62 and the lower housing part 64 are fastened to one another, the receiving unit 60 has, at a rear end region with respect to the panel support 2, a bearing section 66 which has an opening 67 in a direction facing away from the panel support 2. On a mounting section 102 attached to the housing outer wall of the receiving unit 60, a microswitch 100 is provided in the region of the bearing section 66 in order to detect an operating position of the water tank.

Figure 3:
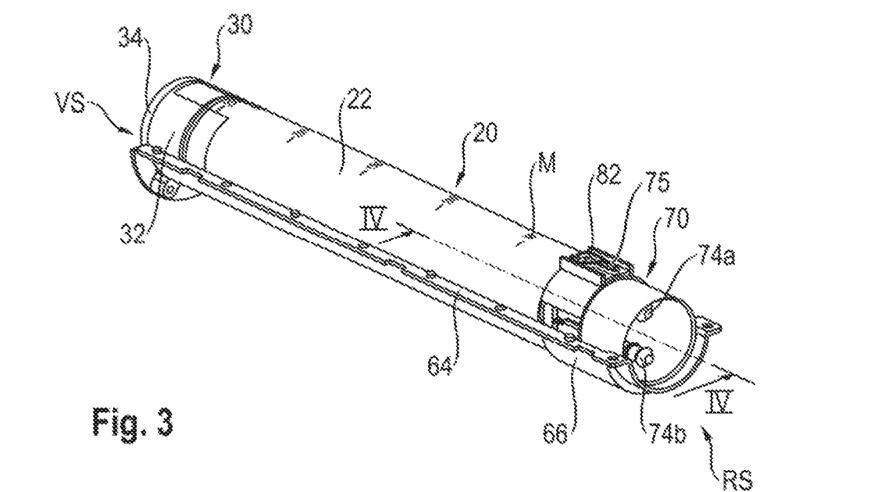
FIG. 3 shows a perspective view of the rear side of a water tank of the steam cooking appliance according to the first exemplary embodiment of the present invention.

FIG. 3 shows a perspective view of the rear side of the water tank 20 of the steam cooking appliance according to the first exemplary embodiment of the present invention, wherein the water tank 20 is accommodated in the lower housing part 64 of the receiving unit 60. A closure cover 32, which closes the water tank 20 in a water-tight manner, is attached to the main body 22 of the water tank 20 on the front side VS facing a user. For better integration of the water tank 20 into the design of the steam cooking appliance, a cover cap 34 is attached to the side facing a user, which cover cap 34 has the same design as the panel and/or the toggle of the steam cooking appliance. Markings M are provided on an upper side of the main body 22 in order to indicate the quantity of water introduced in a filling state of the water tank 20.

Attached to the rear side RS of the water tank 20 is an adapter part 70 which is received in a bearing section 66 of the receiving unit 60. On its upper side, the adapter part 70 has a slotted guide 75 in the form of a cardioid. A sliding block 82 is guided in the slotted guide 75 in order to implement a push-push unit for ejecting the water tank 20. On the rear side of the adapter part 70, there are two second connecting means 74a and 74b which can be connected to an evaporator unit by means of a hose or a pipeline. The two second connecting means 74a and 74b are structurally identical and have the same flow cross-section. For simpler fastening of a hose or a pipeline, the connecting means 74a and 74b each have, at one end section, a conically tapering receiving region with a sealing groove arranged behind the receiving region.

Figure 4:
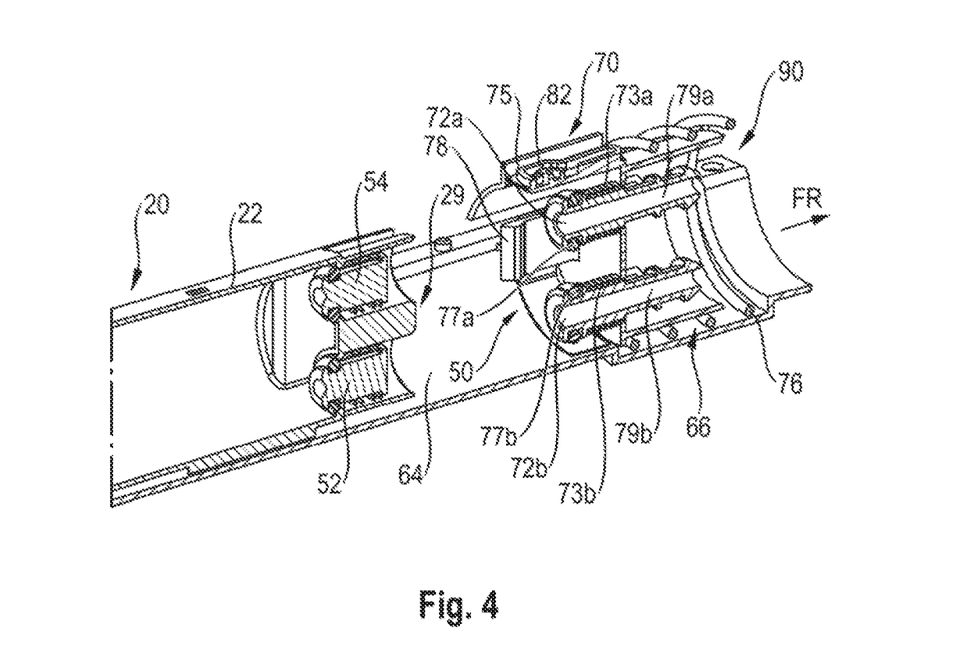
FIG. 4 shows a diagrammatic sectional view of a rear section of the water tank of FIG. 3 along the section plane IV-IV.

FIG. 4 shows a diagrammatic sectional view of a rear section of the water tank of FIG. 3 along the section plane IV-IV from FIG. 3. As is readily apparent from FIG. 4, a valve unit 50 formed by two valves 52 and 54 is arranged on a rear end section of the main body 22 of the water tank 20 in an outlet opening 29. Water or air can be guided through the valve 52 and the valve 54.

The adapter part 70 is displaceably mounted in a bearing section 66 of the receiving unit 60. Due to a compression spring 76 supported on an edge of the receiving unit 60, the adapter part 70 is acted upon by a spring force in the direction of the water tank 20. As already described in FIG. 3, the slotted guide is located on the upper side of the adapter part 70 in the form of a cardioid in which the sliding block 82 is guided. Due to the fact that the adapter part 70 in the receiving unit 60 is mounted in a moveable manner by means of the compression spring 76 with a spring force and has a slotted guide on the top side, a push-push unit can be realized by means of which the water tank 20 can be reversibly inserted and removed in the steam cooking appliance.

The adapter part 70 is provided with a latching hook 78 which can be brought into engagement with a corresponding latching projection formed on the main body 22 of the water tank 20 in an operating state in order to hold the water tank 20 in the receiving unit 60. Although only one latching hook 78 is shown in FIG. 4, two latching hooks 78 are provided in the concrete embodiment.

The adapter part 70 has two connecting elements 79a and 79b which are formed separately from one another and through which a first connecting element 72a and 72b in the form of a sealing connection piece and a second connecting element 74a or 74b are formed. On a section facing the water tank 20, the connecting elements 79a, 79b each have a seal 77a, 77b which is formed as an O-ring and is arranged between a flange section and a circumferential edge section of the respective connecting element 79a, 79b. In an operating state of the water tank 20, the end section of the respective connecting element 79a, 79b facing the water tank 20 is coupled to the valve 54 or 52. The connecting elements 79a and 79b are acted upon by a spring force by a spring 73a or 73b in the direction of the water tank 20.

Figure 5:
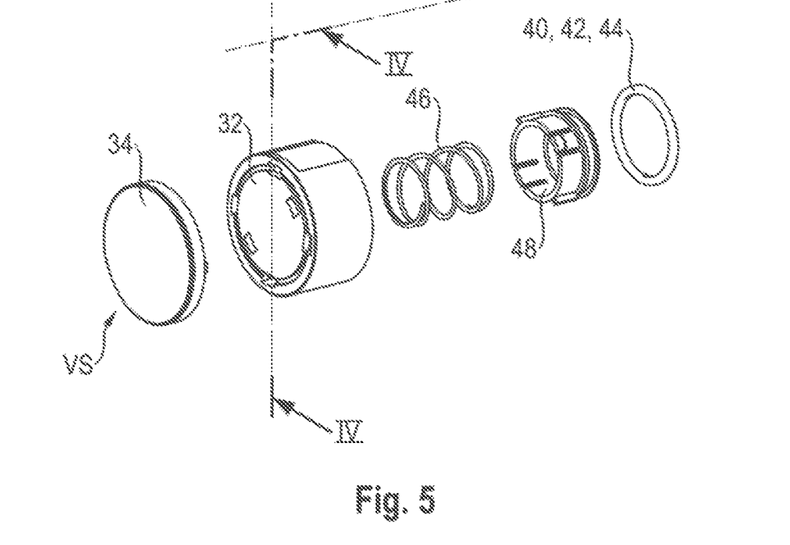
FIG. 5 shows a diagrammatic exploded view of a closure element of a steam cooking appliance according to a second exemplary embodiment of the present invention.

FIG. 5 shows a diagrammatic exploded view of a closure element of a steam cooking appliance according to a second exemplary embodiment of the present invention. In contrast to the first exemplary embodiment, the closure element 30 is formed from a closure cover 32, a cover cap 34 attached to the front side of the closure cover 32, a seal support 48 with an O-ring 44 mounted thereon, and a spring 46 arranged between the seal support 48 and the closure cover 32. The O-ring 44 is attached to the seal support 48 on the circumferential side on an end section facing away from the closure cover 32. On the section facing the closure cover 32, the seal support 48 has a plurality of latching elements with which the seal support 48 is fastened to the closure cover 32, with the interjacent spring 46. The spring 46 is designed as a compression spring, so that it is supported on the one hand on the closure cover 32 and on the other hand applies a spring force to the seal support 48.

Figure 6:
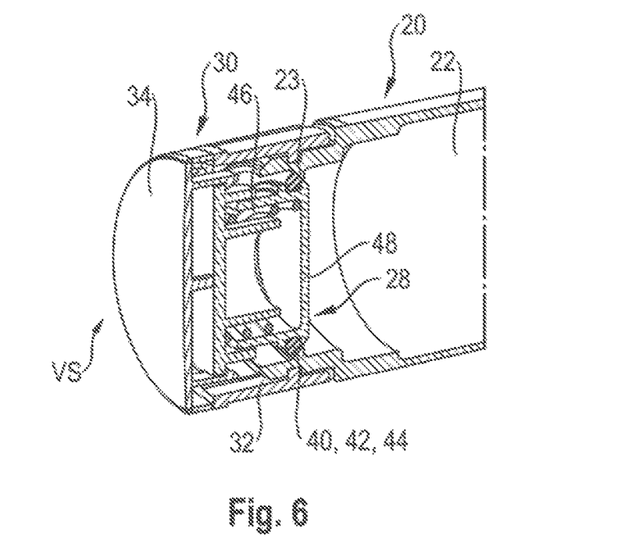
FIG. 6 shows a diagrammatic sectional view along the section plane IV-IV from FIG. 5, wherein the closure element is mounted on a main body of the water tank.

FIG. 6 shows a diagrammatic sectional view along the section plane IV-IV from FIG. 5, wherein the closure element is mounted on a main body of the water tank. As can be seen from FIG. 6, in the state in which the closure element 30 is screwed to the main body 22 of the water tank 20, the O-ring seal 44 is pressed against the sealing edge 23 formed on the main body 22 by the spring force produced by the spring 46. The sealing edge 23 is formed circumferentially in the interior of the main body 22. The sealing edge 23 is formed on the circumferential side in the interior of the main body 22. Furthermore, it can be seen in FIG. 6 that at its end section facing the closure element 30, the main body 22 of the water tank 20 has a diameter which is smaller than the diameter outside the end section. The outer diameter of the closure element 30 essentially corresponds to the outer diameter of the main body 22 of the water tank 20. The inner diameter of the closure element 30 essentially corresponds to the outer diameter of the end section of the main body 22 facing the closure element 30.

The invention claimed is:

1. A steam cooking appliance, comprising:
a cooking chamber;
an evaporator unit configured to evaporate water to generate steam for supply into the cooking chamber; and
a water supply unit including a removable water tank, said water tank comprising a valve unit for coupling to the evaporator, said valve unit including two valves formed separately from one another and each of the two valve separately coupling the water supply unit to the evaporator,
wherein, in an operating state of the steam cooking appliance, a first valve of the two valves is configured to guide water from the water tank of the water supply unit to the evaporator unit upon the first valve being coupled to the evaporator unit and a second valve of the two valves is configured to guide air from the evaporator unit to the water tank of the water supply unit upon the second valve being coupled to the evaporator unit.

2. The steam cooking appliance of claim 1, wherein the valves are essentially arranged one above the other in an installed position of the water tank.

3. The steam cooking appliance of claim 1, further comprising a panel support, said water supply unit includes a receiving unit for receiving the water tank, said receiving unit being attached to the panel support and having an essentially elongated configuration.

4. The steam cooking appliance of claim 3, wherein the receiving unit has a cylindrical or circular-cylindrical configuration.

5. The steam cooking appliance of claim 3, wherein the receiving unit includes an adapter part having two first connections for fluidically coupling to the water tank in an operating position and two second connections for fluidically coupling to the evaporator unit.

6. The steam cooking appliance of claim 5, wherein the adapter part includes at least one latching hook for latching the water tank to the adapter part.

7. The steam cooking appliance of claim 5, wherein the adapter part includes two connecting elements which are formed separately from one another, one of the two connecting elements forming one of the first connections and one of the second connections, and with another one of the two connecting elements forming another one of the first connections and another one of the second connections.

8. The steam cooking appliance of claim 7, wherein the first connections are each formed by a sealing connection piece for fluidically coupling to the valves.

9. The steam cooking appliance of claim 8, wherein the sealing connection pieces are essentially supported on the adapter part in an actuating direction of the water tank.

10. The steam cooking appliance of claim 8, wherein the sealing connection pieces each have a seal.

11. The steam cooking appliance of claim 10, wherein the seal is an O-ring rubber seal.

12. The steam cooking appliance of claim 5, wherein the adapter part is mounted in a bearing section formed in the receiving unit for displacement essentially in an actuating direction of the water tank.

13. The steam cooking appliance of claim 5, wherein the adapter part has a slotted guide, and further comprising a spring acting upon the adapter part essentially in an actuating direction in a spring-loaded manner, and a sliding block engaging in the slotted guide.

14. The steam cooking appliance of claim 13, further comprising a retaining clip, said sliding block being guided in the retaining clip.

15. The steam cooking appliance of claim 1, wherein the water tank includes a main body, said water tank having a front side facing a user, and a closure element provided on the front side and fastened to the main body of the water tank.

16. The steam cooking appliance of claim 15, wherein the closure element is fastened to the main body of the water tank via a bayonet or screw closure.

17. The steam cooking appliance of claim 15, wherein the closure element includes a cover cap having at least one section which in an installed position forms the front side of the water tank.

18. The steam cooking appliance of claim 1, further comprising a push-push unit configured for removing the water tank from the steam cooking appliance.

19. The steam cooking appliance of claim 2, wherein the second valve is essentially arranged above the first valve in the installed position of the water tank such that water is guided by the first valve from the water tank of the water supply unit to the evaporator unit upon the first valve being coupled to the evaporator unit and the air is guided by the second valve from the evaporator unit to the water tank of the water supply unit upon the second valve being coupled to the evaporator unit.

20. The steam cooking appliance of claim 5, wherein the two first connections of the adapter part of the receiving unit are fluidically coupled to the first valve and the second valve, respectively, of the water tank in the operating position thereby forming a closed circuit between the water tank of the water supply unit and the evaporator unit such that the water is guided by the first valve from the water tank of the water supply unit to the evaporator unit and the air is guided by the second valve from the evaporator unit to the water tank of the water supply unit.

21. The steam cooking appliance of claim 1, wherein the first valve and the second valve are structurally identical.

22. The steam cooking appliance of claim 1, wherein each of the first valve and the second valve are exhaust valves.

23. The steam cooking appliance of claim 1, wherein the second valve is essentially arranged above the first valve in the installed position of the water tank,
    wherein the first valve is configured such that the water is guided by the first valve from the water tank of the water supply unit to the evaporator unit as soon as the first valve is coupled to the evaporator unit, and
    wherein the second valve is configured such that the air is guided by the second valve from the evaporator unit to the water tank of the water supply unit as soon as the second valve is coupled to the evaporator unit.

* * * * *